United States Patent
Chen et al.

(10) Patent No.: US 10,440,723 B2
(45) Date of Patent: Oct. 8, 2019

(54) HIERARCHICAL CHANNEL ASSIGNMENT IN WIRELESS NETWORKS

(71) Applicant: Cisco Technology, Inc., San Jose, CA (US)

(72) Inventors: Bo Chen, San Francisco, CA (US); Mark Hendrick, San Francisco, CA (US); Feng Wang, Fremont, CA (US); Derrick Pallas, San Francisco, CA (US); Simon Barber, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 114 days.

(21) Appl. No.: 15/690,979

(22) Filed: Aug. 30, 2017

(65) Prior Publication Data
US 2018/0338315 A1 Nov. 22, 2018

Related U.S. Application Data

(60) Provisional application No. 62/507,473, filed on May 17, 2017.

(51) Int. Cl.
*H04W 72/08* (2009.01)
*H04W 36/00* (2009.01)
(Continued)

(52) U.S. Cl.
CPC ........... *H04W 72/085* (2013.01); *H04L 43/08* (2013.01); *H04W 16/10* (2013.01); *H04W 24/02* (2013.01);
(Continued)

(58) Field of Classification Search
CPC ............... H04W 72/085; H04W 16/10; H04W 36/0061; H04W 40/00; H04W 48/20; H04W 88/08; H04W 84/12; H04L 43/08
(Continued)

(56) References Cited

U.S. PATENT DOCUMENTS

| 4,236,068 A | 11/1980 | Walton |
| 5,642,303 A | 6/1997 | Small et al. |

(Continued)

FOREIGN PATENT DOCUMENTS

| WO | WO-2009094264 A2 * | 7/2009 | ........ H04W 72/0486 |
| WO | WO 2013/020126 | 2/2013 | |

(Continued)

OTHER PUBLICATIONS

"I Love WiFi, The difference between L2 and L3 Roaming Events," Apr. 1, 2010, 6 pages.
(Continued)

*Primary Examiner* — Christopher R Crompton
(74) *Attorney, Agent, or Firm* — Polsinelli PC

(57) ABSTRACT

Aspects of the disclosed technology address the problems of calculating and performing channel assignments for access points (APs) in a wireless network. In some aspects, a process for performing channel assignment can include steps for identifying multiple APs in a network, each of the wireless APs being associated with an initial channel assignment, selecting an AP from among the wireless APs in the network, determining a channel quality for the initial channel assignment associated with the AP, and selecting a new channel for the AP based on the channel quality. In some aspects, the process further includes steps for selecting a second AP, determining a channel quality for the initial channel assignment associated with the second AP, and selecting a new channel for the second AP based on the channel quality. Systems and machine-readable media are also provided.

20 Claims, 7 Drawing Sheets

(51) Int. Cl.
  *H04W 48/20* (2009.01)
  *H04L 12/26* (2006.01)
  *H04W 16/10* (2009.01)
  *H04W 40/00* (2009.01)
  *H04W 24/02* (2009.01)
  *H04W 84/12* (2009.01)
  *H04W 88/08* (2009.01)

(52) U.S. Cl.
  CPC ....... *H04W 36/0061* (2013.01); *H04W 40/00* (2013.01); *H04W 48/20* (2013.01); *H04W 84/12* (2013.01); *H04W 88/08* (2013.01)

(58) Field of Classification Search
  USPC .......................................................... 370/329
  See application file for complete search history.

(56) References Cited

U.S. PATENT DOCUMENTS

| | | |
|---|---|---|
| 5,751,223 A | 5/1998 | Turner |
| 6,812,824 B1 | 11/2004 | Goldinger et al. |
| D552,603 S | 10/2007 | Tierney |
| 7,573,862 B2 | 8/2009 | Chambers et al. |
| D637,569 S | 5/2011 | Desai et al. |
| 7,975,262 B2 | 7/2011 | Cozmei |
| 8,010,079 B2 | 8/2011 | Mia et al. |
| 8,102,814 B2 | 1/2012 | Rahman et al. |
| 8,260,320 B2 | 9/2012 | Herz |
| 8,284,748 B2 | 10/2012 | Borghei |
| 8,300,594 B1 | 10/2012 | Bernier et al. |
| 8,325,626 B2 | 12/2012 | Tóth et al. |
| 8,396,485 B2 | 3/2013 | Grainger et al. |
| 8,446,899 B2 | 5/2013 | Lei et al. |
| 8,458,184 B2 | 6/2013 | Dorogusker et al. |
| D691,636 S | 10/2013 | Bunton |
| 8,549,638 B2 | 10/2013 | Aziz |
| 8,644,301 B2 | 2/2014 | Tamhankar et al. |
| 8,650,279 B2 | 2/2014 | Mehta et al. |
| 8,669,902 B2 | 3/2014 | Pandey et al. |
| 8,676,182 B2 | 3/2014 | Bell et al. |
| 8,682,279 B2 | 3/2014 | Rudolf et al. |
| 8,693,367 B2 | 4/2014 | Chowdhury et al. |
| 8,718,644 B2 | 5/2014 | Thomas et al. |
| 8,768,389 B2 | 7/2014 | Nenner et al. |
| 8,849,283 B2 | 9/2014 | Rudolf et al. |
| 8,909,698 B2 | 12/2014 | Parmar et al. |
| 8,958,318 B1 | 2/2015 | Hastwell et al. |
| 9,060,352 B2 | 6/2015 | Chan et al. |
| 9,130,859 B1 | 9/2015 | Knappe |
| 9,173,084 B1 | 10/2015 | Foskett |
| 9,173,158 B2 | 10/2015 | Varma |
| D744,464 S | 12/2015 | Snyder et al. |
| D757,424 S | 5/2016 | Phillips et al. |
| D759,639 S | 6/2016 | Moon et al. |
| 9,389,992 B2 | 7/2016 | Gataullin et al. |
| 9,426,305 B2 | 8/2016 | De Foy et al. |
| D767,548 S | 9/2016 | Snyder et al. |
| D776,634 S | 1/2017 | Lee et al. |
| 9,544,337 B2 | 1/2017 | Eswara et al. |
| 9,609,504 B2 | 3/2017 | Karlqvist et al. |
| 9,642,167 B1 | 5/2017 | Snyder et al. |
| 9,654,344 B2 | 5/2017 | Chan et al. |
| 9,713,114 B2 | 7/2017 | Yu |
| 9,772,927 B2 | 9/2017 | Gounares et al. |
| 9,820,105 B2 | 11/2017 | Snyder et al. |
| D804,450 S | 12/2017 | Speil et al. |
| 9,858,559 B2 | 1/2018 | Raleigh et al. |
| 9,860,151 B2 | 1/2018 | Ganichev et al. |
| 9,933,224 B2 | 2/2018 | Dumitriu et al. |
| 9,923,780 B2 | 3/2018 | Rao et al. |
| 9,967,906 B2 | 5/2018 | Verkaik et al. |
| 9,980,220 B2 | 5/2018 | Snyder et al. |
| 9,985,837 B2 | 5/2018 | Rao et al. |
| 2003/0087645 A1 | 5/2003 | Kim et al. |
| 2003/0116634 A1 | 6/2003 | Tanaka |
| 2004/0203572 A1 | 10/2004 | Aerrabotu et al. |
| 2005/0090225 A1 | 4/2005 | Muehleisen et al. |
| 2005/0169193 A1 | 8/2005 | Black et al. |
| 2005/0186904 A1 | 8/2005 | Kowalski et al. |
| 2006/0009226 A1* | 1/2006 | Vicharelli ............. H04W 16/18 455/450 |
| 2006/0022815 A1 | 2/2006 | Fischer et al. |
| 2006/0030290 A1 | 2/2006 | Rudolf et al. |
| 2006/0092964 A1 | 5/2006 | Park et al. |
| 2006/0126882 A1 | 6/2006 | Deng et al. |
| 2006/0187866 A1 | 8/2006 | Werb et al. |
| 2007/0037605 A1 | 2/2007 | Logan |
| 2007/0239854 A1 | 10/2007 | Janakiraman et al. |
| 2008/0037715 A1 | 2/2008 | Prozeniuk et al. |
| 2008/0084888 A1 | 4/2008 | Yadav et al. |
| 2008/0101381 A1 | 5/2008 | Sun et al. |
| 2008/0163207 A1 | 7/2008 | Reumann et al. |
| 2008/0233969 A1 | 9/2008 | Mergen |
| 2009/0086706 A1* | 4/2009 | Huang .................. H04L 1/0026 370/349 |
| 2009/0129389 A1 | 5/2009 | Halna DeFretay et al. |
| 2009/0203370 A1 | 8/2009 | Giles et al. |
| 2009/0232026 A1 | 9/2009 | Lu |
| 2009/0282048 A1 | 11/2009 | Ransom et al. |
| 2009/0298511 A1 | 12/2009 | Paulson |
| 2009/0307485 A1 | 12/2009 | Weniger et al. |
| 2010/0039280 A1 | 2/2010 | Holm et al. |
| 2010/0097969 A1 | 4/2010 | De Kimpe et al. |
| 2010/0301992 A1* | 12/2010 | Chandra ............... H04W 16/14 340/5.1 |
| 2010/0304678 A1* | 12/2010 | Chandra ............... H04W 16/14 455/62 |
| 2011/0051677 A1* | 3/2011 | Jetcheva ........... H04W 72/0486 370/329 |
| 2011/0087799 A1 | 4/2011 | Padhye et al. |
| 2011/0142053 A1 | 6/2011 | Van Der Merwe et al. |
| 2011/0182295 A1 | 7/2011 | Singh et al. |
| 2011/0194553 A1 | 8/2011 | Sahin et al. |
| 2011/0228779 A1 | 9/2011 | Goergen |
| 2012/0023552 A1 | 1/2012 | Brown et al. |
| 2012/0044905 A1* | 2/2012 | Kim ..................... H04L 1/1854 370/329 |
| 2012/0054367 A1 | 3/2012 | Ramakrishnan et al. |
| 2012/0088476 A1 | 4/2012 | Greenfield |
| 2012/0115512 A1 | 5/2012 | Grainger et al. |
| 2012/0157126 A1 | 6/2012 | Rekimoto |
| 2012/0167207 A1 | 6/2012 | Beckley et al. |
| 2012/0182147 A1 | 7/2012 | Forster |
| 2012/0311127 A1 | 12/2012 | Kandula et al. |
| 2012/0324035 A1 | 12/2012 | Cantu et al. |
| 2013/0029685 A1 | 1/2013 | Moshfeghi |
| 2013/0039391 A1 | 2/2013 | Skarp |
| 2013/0057435 A1 | 3/2013 | Kim |
| 2013/0077612 A1 | 3/2013 | Khorami |
| 2013/0088983 A1 | 4/2013 | Pragada et al. |
| 2013/0107853 A1 | 5/2013 | Pettus et al. |
| 2013/0108263 A1 | 5/2013 | Srinivas et al. |
| 2013/0115916 A1 | 5/2013 | Herz |
| 2013/0145008 A1 | 6/2013 | Kannan et al. |
| 2013/0155906 A1 | 6/2013 | Nachum et al. |
| 2013/0191567 A1 | 7/2013 | Rofougaran et al. |
| 2013/0203445 A1 | 8/2013 | Grainger et al. |
| 2013/0217332 A1 | 8/2013 | Altman et al. |
| 2013/0232433 A1 | 9/2013 | Krajec et al. |
| 2013/0273938 A1 | 10/2013 | Ng et al. |
| 2013/0317944 A1 | 11/2013 | Huang et al. |
| 2013/0322438 A1 | 12/2013 | Gospodarek et al. |
| 2013/0343198 A1 | 12/2013 | Chhabra et al. |
| 2013/0347103 A1 | 12/2013 | Veteikis et al. |
| 2014/0007089 A1 | 1/2014 | Bosch et al. |
| 2014/0016926 A1 | 1/2014 | Soto et al. |
| 2014/0025770 A1 | 1/2014 | Warfield et al. |
| 2014/0052508 A1 | 2/2014 | Pandey et al. |
| 2014/0059655 A1 | 2/2014 | Beckley et al. |
| 2014/0087693 A1 | 3/2014 | Walby et al. |
| 2014/0105213 A1 | 4/2014 | A K et al. |
| 2014/0118113 A1 | 5/2014 | Kaushik et al. |
| 2014/0148196 A1 | 5/2014 | Bassan-Eskenazi et al. |

(56) References Cited

U.S. PATENT DOCUMENTS

| | | |
|---|---|---|
| 2014/0179352 A1 | 6/2014 | V.M. et al. |
| 2014/0191868 A1 | 7/2014 | Ortiz et al. |
| 2014/0198808 A1 | 7/2014 | Zhou |
| 2014/0233460 A1 | 8/2014 | Pettus et al. |
| 2014/0269321 A1 | 9/2014 | Kamble et al. |
| 2014/0302869 A1 | 10/2014 | Rosenbaum et al. |
| 2014/0337824 A1 | 11/2014 | St. John et al. |
| 2014/0341568 A1 | 11/2014 | Zhang et al. |
| 2015/0016286 A1 | 1/2015 | Ganichev et al. |
| 2015/0016469 A1 | 1/2015 | Ganichev et al. |
| 2015/0030024 A1 | 1/2015 | Venkataswami et al. |
| 2015/0043581 A1 | 2/2015 | Devireddy et al. |
| 2015/0063166 A1 | 3/2015 | Sif et al. |
| 2015/0065161 A1 | 3/2015 | Ganesh et al. |
| 2015/0087330 A1 | 3/2015 | Prechner et al. |
| 2015/0103818 A1 | 4/2015 | Kuhn et al. |
| 2015/0163192 A1 | 6/2015 | Jain et al. |
| 2015/0172391 A1 | 6/2015 | Kasslin et al. |
| 2015/0223337 A1 | 8/2015 | Steinmacher-Burow |
| 2015/0256972 A1 | 9/2015 | Markhovsky et al. |
| 2015/0264519 A1 | 9/2015 | Mirzaei et al. |
| 2015/0280827 A1 | 10/2015 | Adiletta et al. |
| 2015/0288410 A1 | 10/2015 | Adiletta et al. |
| 2015/0289147 A1* | 10/2015 | Lou .................... H04B 7/0408 370/329 |
| 2015/0326704 A1 | 11/2015 | Ko et al. |
| 2015/0341939 A1 | 11/2015 | Sharma et al. |
| 2015/0358777 A1 | 12/2015 | Gupta |
| 2015/0362581 A1 | 12/2015 | Friedman et al. |
| 2016/0007315 A1 | 1/2016 | Lundgreen et al. |
| 2016/0044627 A1 | 2/2016 | Aggarwal et al. |
| 2016/0099847 A1 | 4/2016 | Melander et al. |
| 2016/0105408 A1 | 4/2016 | Cooper et al. |
| 2016/0127875 A1 | 5/2016 | Zampini, II |
| 2016/0146495 A1 | 5/2016 | Malve et al. |
| 2016/0344641 A1 | 11/2016 | Javidi et al. |
| 2017/0026974 A1 | 1/2017 | Dey et al. |
| 2017/0214551 A1 | 7/2017 | Chan et al. |
| 2018/0069311 A1 | 3/2018 | Pallas et al. |
| 2018/0084389 A1 | 3/2018 | Snyder et al. |

FOREIGN PATENT DOCUMENTS

| | | |
|---|---|---|
| WO | WO 2014/098556 | 6/2014 |
| WO | WO 2018/009340 | 1/2018 |

OTHER PUBLICATIONS

Carter, Steve Sr., "E911 VoIP Essentials for Enterprise Deployments," XO Communications, LLC, 2012, 9 pages.

Chalise, Batu K., et al., "MIMO Relaying for Multiaccess Communication in Cellular Networks," Sensor Array and MultiChannel Signal Processing Workshop, 2008, Sam 2008, 5th IEEE, Jul. 21, 2008, pp. 146-150.

Cisco Systems, Inc., "Wi-FI Location-Based Services 4.1 Design Guide," May 20, 2008, 206 pages.

Cui, Wenzhi et al., "DiFS: Distributed Flow Scheduling for Data Center Networks," Nanjing University, China, Jul. 28, 2013, 10 pages.

Galvan T., Carlos E., et al., "Wifi bluetooth based combined positioning algorithm," International Meeting of Electrical Engineering Research ENIINVIE 2012, Procedia Engineering 35 (2012 ), pp. 101-108.

Gesbert, David, "Advances in Multiuser MIMO Systems (Tutorial Part II) Emerging Topics in Multiuser MIMO Networks," IEEE PIMRC Conference, Sep. 2007, 107 pages.

Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.

Ji, Philip N., et al., "Demonstration of High-Speed MIMO OFDM Flexible Bandwidth Data Center Network," Optical Society of America, 2012, 2 pages.

Kandula, Srikanth, et al., "Flyways to De-Congest Data Center Networks," Microsoft Research, Oct. 23, 2009, 6 pages.

Katayama, Y. et al., "MIMO Link Design Strategy for Wireless Data Center Applications," IEEE Wireless Communications and Networking Conference: Services, Applications, and Business, 2012, 5 pages.

Leary, Jonathan, et al., "Wireless LAN Fundamentals: Mobility," Jan. 9, 2004, Cisco Press, 15 pages.

Network Heresy, "NVGRE, VXLAN and What Microsoft is Doing Right," Oct. 3, 2011, 5 pages.

Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.

Afolabi, Ibrahim, et al., "Network Slicing & Softwarization: A Survey on Principles, Enabling Technologies & Solutions," Mar. 21, 2018, pp. 1-24.

Antonioli, Roberto, et al., "Dual Connectivity for LTE-NR Cellular Networks," Research Gate, Sep. 3-6, 2017, pp. 171-175.

Cisco ASR 5x00 Mobility Management Entity Administration Guide, Version 15.0, Last updated Jun. 13, 2014, Cisco, 1-266.

Cox, Jacob H. Jr., et al., "Advancing Software-Defined Networks: A Survey," IEEE, Oct. 12, 2017, pp. 25487-25526.

Saraiva de Sousa, Nathan F., et al., "Network Service Orchestration: A Survey," IEEE Communications Surveys & Tutorials, Mar. 23, 2018, pp. 1-30.

Geller, Michael, et al. , "5G Security Innovation with Cisco," Whitepaper Cisco Public, Jun. 8, 2018, pp. 1-29.

Ventre, Pier Luigi, et al., "Performance Evaluation and Tuning of Virtual Infrastructure Managers for (Micro) Virtual Network Functions," ieee.org, Nov. 7-10, 2016, pp. 1-7.

International Search Report and Written Opinion from the International Searching Authority, dated Jul. 18, 2018, 10 pages, for the corresponding International Patent Application No. PCT/US18/32908.

* cited by examiner

US 10,440,723 B2

HIERARCHICAL CHANNEL ASSIGNMENT IN WIRELESS NETWORKS

CROSS-REFERENCE TO RELATED APPLICATIONS

This application claims the benefit of U.S. Application No. 62/507,473 filed May 17, 2017, entitled "HIERARCHAL CHANNEL ASSIGNMENT IN WIRELESS NETWORKS", which is incorporated by reference in its entirety.

BACKGROUND

1. Technical Field

The subject technology provides solutions for performing wireless channel assignments in a wireless network and in particular, for determining optimal channel assignments for hierarchical groups of access points (APs).

2. Introduction

In general, IEEE 802.11 Wireless Local Area Network (WLAN) designs are much simpler than that of the 3G networks because the IEEE 802.11 standard was devised to serve a confined area (e.g., a link distance of at most several hundred meters) with stationary and slow-moving users, while the 3G specifications were developed for greater flexibility, coverage and mobility. As a result, the IEEE 802.11 network can support data rates higher than those by the 3G networks.

Networks based on the IEEE 802.11 standard operate in the unlicensed Industrial, Scientific and Medical (ISM) band. Despite the relatively abundant spectrum (i.e., a total of 75 MHz in the 2.4 GHz Band) at the ISM band, as IEEE 802.11 networks are deployed widely, they start to interfere with each other. Such interference leads to a degradation in network throughput.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION

Figure 1:
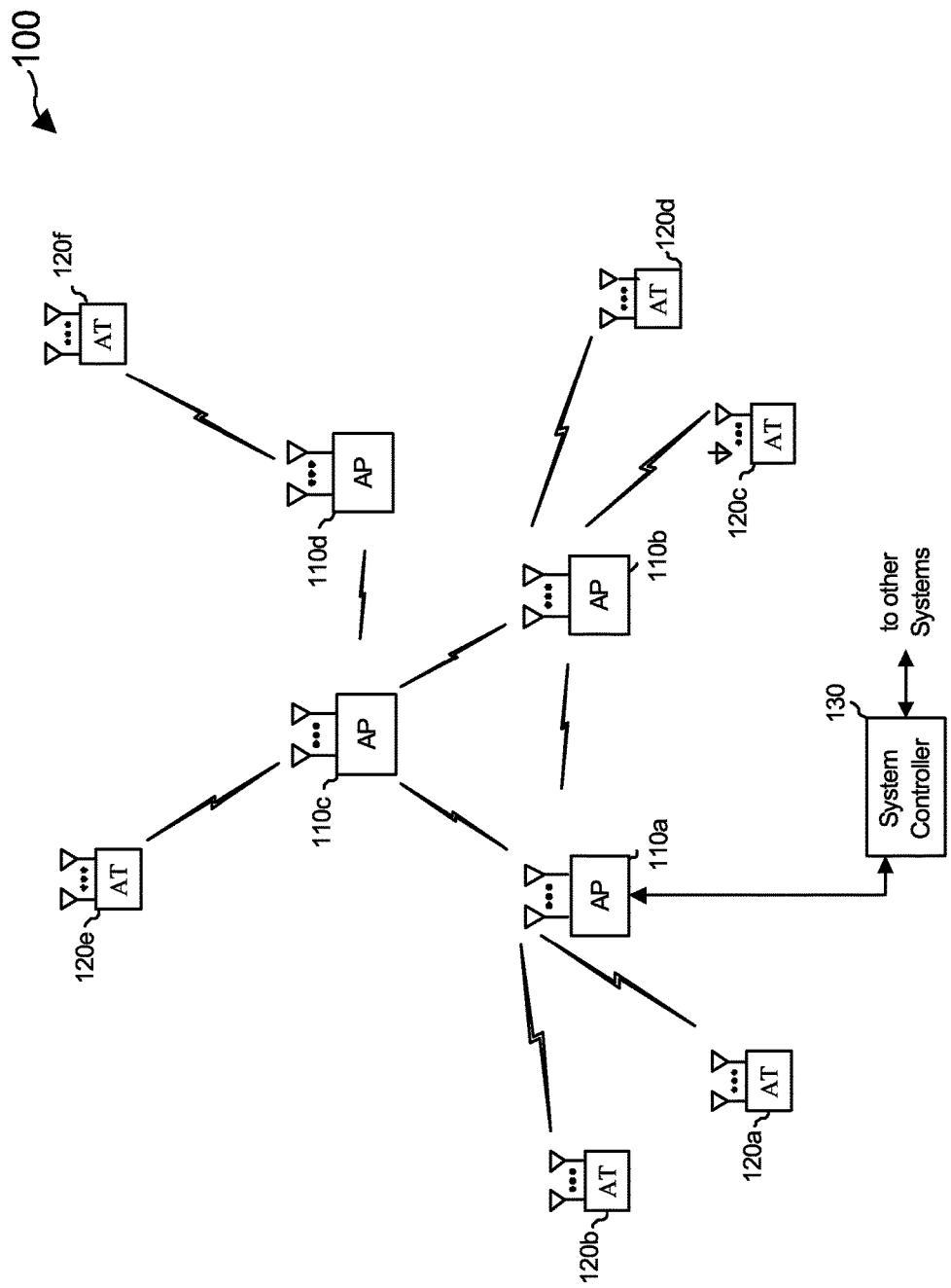
FIG. 1 illustrates an example wireless network environment in which some aspects of the technology can be implemented.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.
Overview:

Frequency planning, i.e., allocation of a limited number of frequencies, for an IEEE 802.11 network is different from that of a traditional cellular network. In typical cellular networks, such as those based on the Global System for Mobile Communications (GSM) and Enhanced Data GSM Evolution (EDGE) standards, two separate radio channels, namely the traffic and control channels, are used to carry user data and control traffic. After the information is successfully received and processed by a base station (BS), the terminal is assigned with a specific traffic channel for transmitting its data traffic.

There is no such distinction between control and traffic channels in IEEE 802.11 networks. Instead, all user data and control information (in both directions between terminals and APs) are carried on the same physical channel. Access to the channel by multiple transmitters is coordinated by the MAC protocol, e.g., the well-known, Carrier Sense Multiple Access (CSMA) protocol with collision avoidance feature. Although the MAC CSMA protocol helps to mitigate much of the co-channel interference in large multi-cell IEEE 802.11 networks, network performance is still often degraded by adjacent-channel interference.

Due to the multiplicity of available channels (frequency bands), APs in conventional wireless deployments typically select an initial channel, and change selections only when significant interference is detected. Due to the potentially large number of nodes in a wireless network, and changing network conditions (e.g., the addition and subtraction of nodes), it is computationally difficult to determine optimal channel assignments for each wireless node in the network. The computation difficulty of optimal channel assignment calculations increases quickly with each added node, making the problem "NP-complete." The problem is made further intractable by the dynamic nature of modern wireless deployments; the need for more frequent channel re-assignment is increased as nodes join, leave, and move within the network.

DESCRIPTION

Aspects of the disclosed technology provide solutions for calculating channel assignments for network nodes (e.g., APs), which can be performed quickly and therefore more frequently, to accommodate changing network characteristics. In some approaches, channel assignments/re-assignments can be calculated in an ordered hierarchy, wherein each "layer" of channel calculation hierarchy is performed with concurrent consideration of channel performance of a selected node and each peer node in a defined group, for example, that is based on network distance.

As discussed in further detail below, a process of channel assignment/re-assignment of the disclosed technology can include steps for identifying a multitude of wireless access points (APs) in a wireless network, each of the wireless APs being associated with an initial channel assignment, selecting an AP in the network, determining a channel quality for the channel assignment associated with the AP, and selecting a new channel for the AP based on the channel quality for the initial channel assignment associated with the first AP. In some aspects, the process can further include steps for selecting a second AP from among the APs in the network, determining a channel quality for the channel assignment associated with the second AP, and selecting a new channel for the second AP based on the channel quality for the initial channel assignment associated with the second AP.

FIG. 1 illustrates an example wireless network environment 100 in which some aspects of the technology can be implemented. Environment 100 includes multiple wireless nodes, such as access points (APs) 110, and access terminals (ATs) 120. Access points 110 can communicate, e.g., according to an IEEE 802.11 protocol, with one or more corresponding ATs 120 on a respective downlink and uplink.

The downlink (i.e., forward link) is the communication link from a given access point 110 to the respectively serviced access terminal 120, and the uplink (i.e., reverse link) is the communication link from one of access terminals 120 to the respective access point 110. In the illustrated example, AP 110a is associated with ATs 120a and 120b; AP110b is associated with ATs 120c and 120d; AP 110c is associated with AT 120e; and AP 110d is associated with AT 120f. It is understood that an AT may also communicate peer-to-peer with another ATs. A system controller 130 couples to and provides coordination and control for the APs. Additionally APs 110 can communicate with other devices coupled to a backbone network (not shown).

In environment 100, each of APs 110a, 110b, and 110c are configured for wireless communication with one another. That is, AP 110d communicates directly with AP 110c. Communication between AP 110d and 110a is facilitated via an intervening node, i.e., AP 100c. In this configuration, each of APs 110a, 110b, and 110c, are "one-hop" neighbors, i.e., they are in direct communication, without intervening network nodes. However, access point 110d is a "two-hop" neighbor of APs 110a, and 110b, since any transmissions sent/received at AP 110d must pass through an intervening node, i.e., AP 110c.

In practice, communication amongst ATs 120 is facilitated by wireless connectivity between APs 110. To reduce the occurrence of wireless collisions, each AP 110 is assigned to an initial channel that corresponds with a specific frequency band in which the AP operates. As discussed above, the likelihood of packet collisions increases if two proximately positioned APs share similar or adjacent channels.

To ensure that channel assignments of adjacent APs afford a high channel quality, a channel reassignment process of the subject technology can be utilized in which channel assignments are made based on a hierarchy of node groupings. In some implementations, channel assignments are made one an AP-by-AP basis, and subsequently updated, for example, by calculating channel assignments of all one-hop neighbors, and the two-hop neighbors, etc.

AP channel calculations are performed in a hierarchy of "layers", in which channel assignments are determined for each node (or group of nodes) in a selected layer, and then re-iterated for each lower layer in the hierarchy. After channel calculations are performed for the selected layer (and iterated for all layers beneath the selected layer), channel calculations can then be made for the next layer up the hierarchy. By way of example, channel calculations begin at the lowest layer in the channel hierarchy (i.e., "layer 0"), in which channel determinations are made for each individual node. Because layer 0 represents the lowest layer in the channel hierarchy, the layer 0 calculation ends after each individual AP channel assignment has been made. Channel calculations are subsequently made for higher layers in the channel hierarchy, that is, the calculation process proceeds up to "layer 1."

In the layer 1 calculation, channel determinations are performed for groups of nodes, for example, all one-hop neighbors of a selected node. After, one-hop group channel assignments have been made, layer 0 calculations are re-iterated, and the layer 1 calculation is complete. The channel calculation algorithm then proceeds up the hierarchy, e.g., to "layer 2" in which channel determinations are performed for groups of nodes comprising all two-hop neighbors of a selected node, followed by layer 1 calculations, and ending with layer 0 calculations. Those of skill in the art will recognize that there are no inherent limitations to the size of groups for which channel calculations can be performed. That is, there are no inherent limitations to the number of layers in a channel hierarchy, and channel calculations could be performed at a hierarchical layer in which a selected group includes every node in the network, without departing from the scope of the technology.

Additionally, in some aspects, the periodicity for computing channel assignments for a particular layer can vary on a layer-by-layer basis. By way of non-limiting example, layer 0 calculations may be performed with a periodicity of p0. Layer 1 calculations (including re-calculations of layer 0) may be performed with a periodicity of p1; and layer 2 calculations (including re-calculations for layer 1 and layer 0) performed with a periodicity of p2, where p0, p1, and p2 are all configured for different time values, such as, 15 minutes, 3 hours, and 1 day, respectively.

Figure 2A:
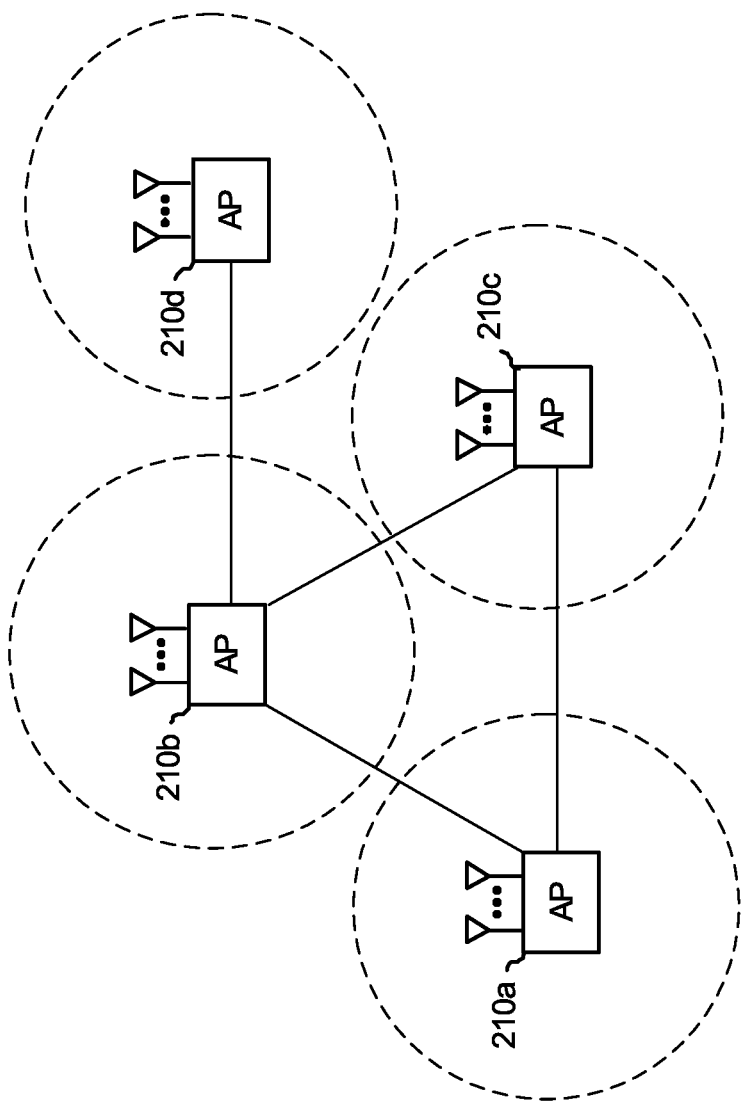
FIG. 2A conceptually illustrates a channel calculation performed on a node-by-node basis, using a hierarchical channel assignment algorithm of the subject technology.

FIG. 2A conceptually illustrates four independent channel calculations performed, using a hierarchical channel assignment algorithm of the technology. In particular, FIG. 2A illustrates an example of a layer 0 channel calculation in which channel determinations for each AP are made on a node-by-node basis.

As illustrated, channel determinations for each of APs 210a, 210b, 210c, and 210d are independently determined, without regard to joint channel switching. For example, a channel is selected for AP 210a, based on frequency availability and other quality metrics with respect to AP 210a, but without consideration for the potential of switching to any currently assigned channels for APs 210b, 210c, or 210d. Similarly independent channel determinations are made for each of APs 210b, 210c, and 210d. Once new channel determinations have been made for each AP in the network, all layer 0 channel assignments are complete, and the process can move up to layer 1.

Using the layer 0 calculation illustrated in FIG. 2A, channel assignments for each AP are locally optimized, but channel selection is not coordinated between different APs. For example, AP 210a and AP 210b could be assigned to channels 6, and 8, respectively. AP 210a and AP 201b may both perform better on channels 8, and 6 respectively. However, due to the fact that channels 6 and 8 are currently occupied, channel assignments for both APs are constrained to only available channels.

Figure 2B:
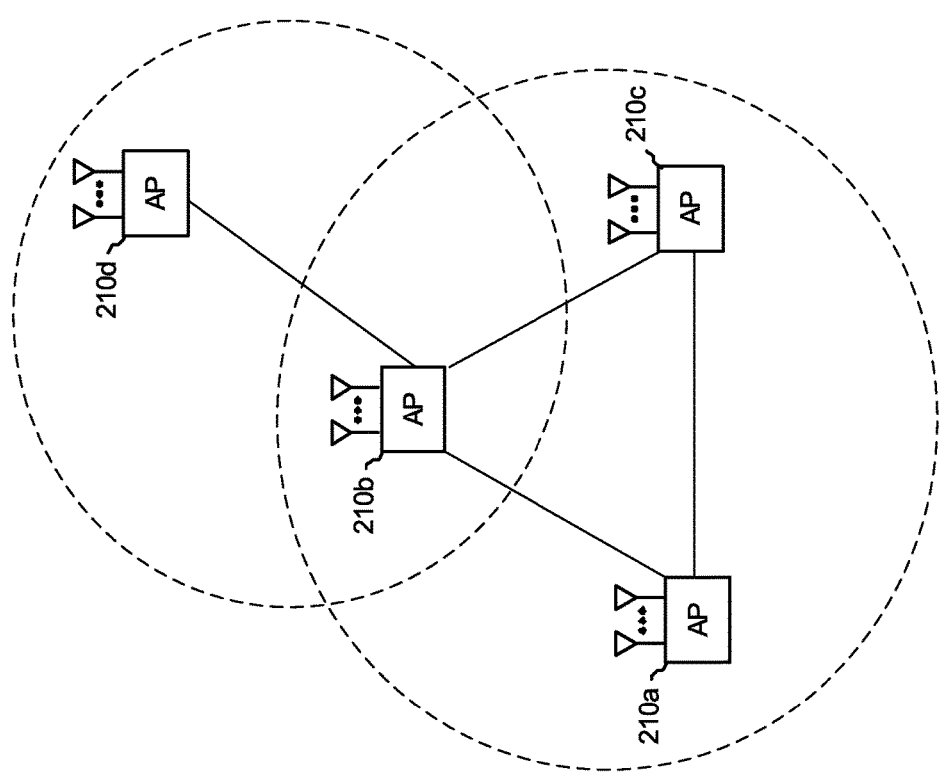
FIG. 2B conceptually illustrates a one-hop-neighbor channel calculation performed using a hierarchical channel assignment algorithm of the subject technology.

FIG. 2B conceptually illustrates a one-hop neighbor (layer 1) channel calculation performed after all layer 0 calculations are complete. In the illustrated example, layer 1 channel re-assignments begin with the selection of AP 210a, and its one-hop network neighbors, i.e., APs 210b, and 210c. Channel calculations for each of APs 210a, 210b, and 210c, i.e., are performed to determine respective frequency assignments that concurrently maximize channel quality for each AP, that is, while taking consideration of the performance gains that may be realized by performing channel swaps between APs in the one-hop group. In this way, AP channel assignments are locally maximized for the assigned group consisting of the selected AP and all one-hop network neighbors.

By way of example, suppose that APs 210a, AP 210b, and AP 210c are assigned to channels 2, 4, and 6, respectively. However, channel calculations indicate that the optimal assignment would be to move APs 210a, 210b, and 210c to channels 6, 4, and 2. Based on the channel availability created by concurrent channel swapping, APs 210a, 210b, and 210c can be reassigned to channels 6, 4, and 2, without any conflict. That is, by taking consideration of each channel change jointly (as a layer 1 group), channel re-assignments can be made for each of APs 210a, 210b, and 210c, thereby optimizing the selected group.

Subsequently, any node that has not been re-assigned can be selected, i.e., AP 210d. In this example, AP 210 exists in a layer 1 (one-hop neighbor) group with AP 210b. However, since the channel with AP 210b has already been re-assigned in layer 1, channel reassignment calculations are only performed for AP 210d. Once the channel assignments are determined for one-hop groups across the network, layer 0 calculations can be re-iterated, as discussed above, completing channel computation for layer 1 of the hierarchy. Subsequently, layer 2 calculations can be performed, for example, in which channel calculations are performed for groups of two-hop neighbors, followed by re-calculation of layer 1 assignments, and terminating with re-calculation of layer 0 assignments, respectively.

The channel calculation process for any hierarchical layer can begin with the selection of a random network node. That is, multiple rounds of channel assignments can be simulated, e.g., by computing assignments for different groups through the selection of different initial nodes. In such approaches, different network-wide channel assignment solutions can be computed and compared without actual deployment, for example, to determine the optimal network-wide channel configuration. Once the optimal configuration is determined, changes can be physically deployed to the network.

Figure 2C:
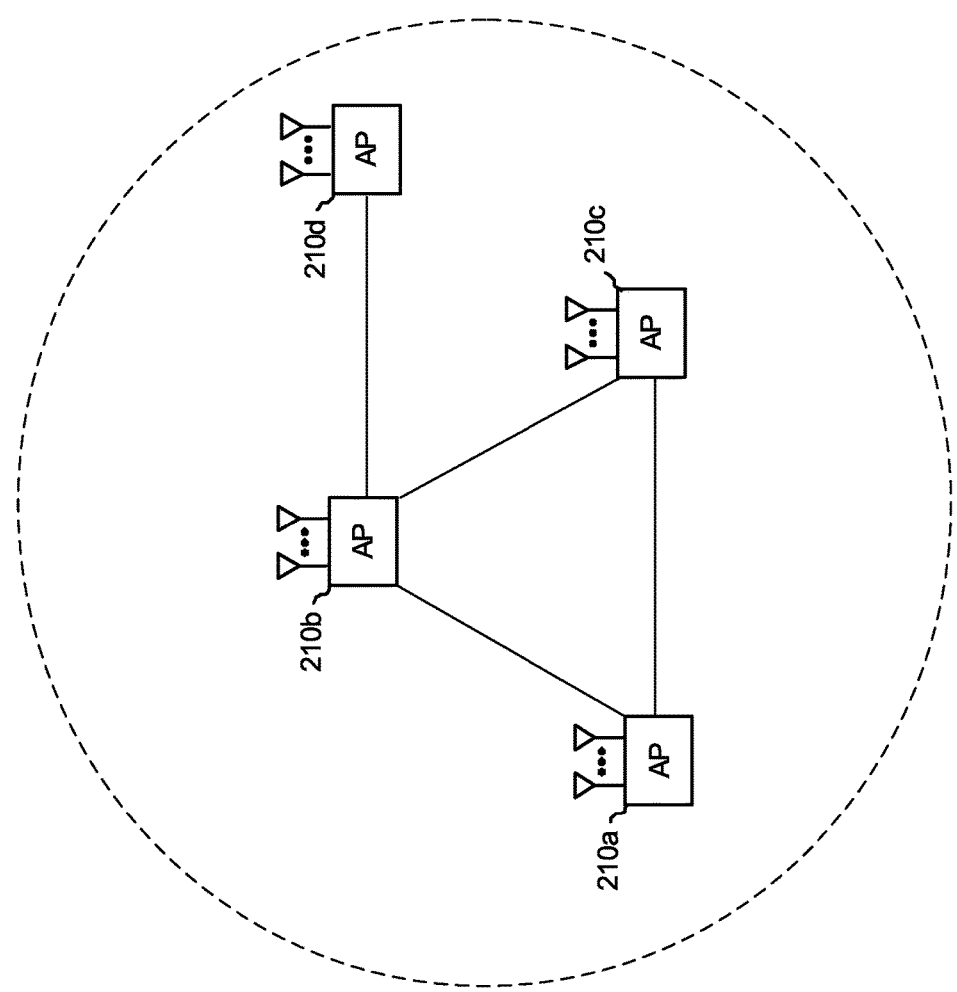
FIG. 2C conceptually illustrates a two-hop-neighbor channel calculation performed using a hierarchical channel assignment algorithm of the subject technology.

FIG. 2C conceptually illustrates a two-hop neighbor (layer 2) channel calculation performed using a hierarchical channel assignment algorithm of the technology. In this example, since APs 210a, 210b, 210c, and 210d are all within a two-hop neighbor radius, the calculation of each new channel assignment is performed taking consideration of the channel quality metrics of each node, and permitting channel swapping between nodes in common two-hop groupings. That is, channel selections for each of APs 210a, 210b, 210c, and 210d are made taking consideration of channel quality for each node, for example, channel selections for each of APs 210a, 210b, 210c, and 210d are made jointly considered as a group. Subsequently, as discussed above, layer 1 calculations are re-iterated, followed by layer 0 channel calculations.

Any number of higher-layer channel calculations can be performed, e.g. considering three-hop, four-hop, or five-hop neighbors, etc., without departing from the technology. It is understood that, given enough computing resources, channel assignments for each node in entire network may be computed.

As would be understood by those of skill in the art, performance for any given node, groups of nodes, or network-wide performance, can depend on virtually any measurable network parameters. As such, channel performance calculations may vary depending on the desired implementation.

In some aspects, a utility function can be used to estimate performance on a channel c with channel width cw using the relationship of equation (1):

$$NodeP(c, cw) = \prod_{b=20MHz}^{cw} channel\_metric(c, b)^{load(b)} \quad (1)$$

where channel_metric(c,b)=airtime(c,b)×capacity(c,b), and where airtime (c,b) represents an estimated proportion of airtime th expected for a given node (AP) on a particular channel c with channel width b, and is calculated based on the channel utilization of the neighboring APs. In this example, capacity(c,b) can be estimated using the channel quality, non-wifi interference, and/or channel width, where load(b) is the channel usage, and is proportional to the number of associated clients with maximum channel width b. In the relationship provided by equation (1), NodeP can have two important properties: (i) if channel c is heavily utilized or there are many neighboring APs on the same channel, NodeP will quickly approach 0; and (ii) if associated clients do not support wider channel width, NodeP will not increase for wider channels. In such instances, an AP can avoid adjusting its channel width according to the client's capability.

Additionally, in some aspects, overall network performance (NetP) can be calculated using the relationship of equation (2):

$$NetP = \prod_{r \in R} NodeP \quad (2)$$

where NetP is the product of channel_metric weighted proportionally by load. In some implementations, this performance function can provide several benefits. First, per-client usage fairness can be maintained. The metric prefers to assign wider channels to APs with higher client density and usage. Second, single node failure is avoided. If spectrum coverage or total network throughput is the performance function, it is easy to have a high metric despite assigning poor channels to several nodes. In contrast, NetP will approach 0 as a single NodeP approaches 0.

Figure 3A:
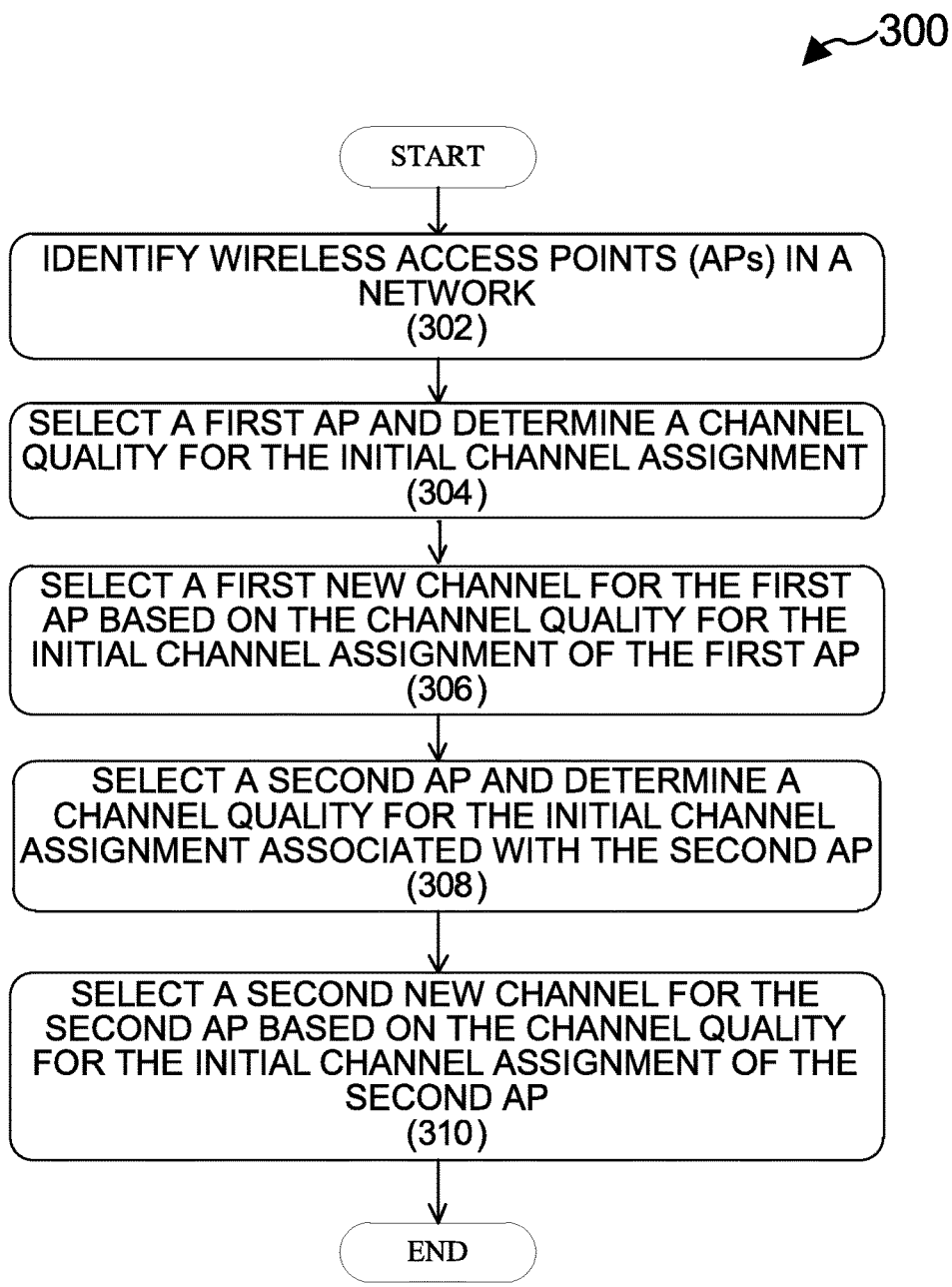
FIGS. 3A and 3B illustrate steps of example processes for implementing hierarchical channel reassignment techniques, according to some aspects of the technology.

FIG. 3A illustrates an example process 300 for implementing a hierarchical channel reassignment technique and in particular, steps for performing a layer 0 channel assignment, according to some aspects of the technology. Process 300 begins with step 302, in which multiple access points (APs) in a wireless network identified for channel re-assignment. Depending on implementation, every AP in the network may be a candidate for channel reassignment; however, a subset of APs may be identified/selected without departing from the scope the technology.

In step 304, a first AP is selected from among the identified APs in step 302. A channel quality for the currently assigned channel (i.e., the initial channel assignment) of the first AP is determined. Channel quality determinations can be based on essentially any measure or parameter that can be used to infer wireless signal quality at the AP. By way of non-limiting example, channel quality can be determined based on one or more of: received signal strength, bit or frame error rate, and/or packet loss metrics, etc.

In step 306 a first new channel for the first AP is selected, based on the channel quality determination made in step 304. In some instances, the determined channel quality for the initial channel assignment (step 304) may be compared to channel quality metrics computed for other available channels in the wireless medium. Therefore, the first new channel selected can be based on a comparison of quality metrics between current and available channel options.

Channel selection can also take into consideration a channel change penalty, such that different channels with equal, or only incrementally better quality metrics may not be preferred over a current channel assignment. Channel change penalties can prevent channel reassignment loops, for example, whereby AP channel assignments bounce between channels of comparable quality. In some aspects, channel change penalties can be function of various network parameters. For example, channel change penalties may be a function of a number of connected client nodes, or bandwidth of active traffic flows, etc.

In step 308, a second AP is selected, and a channel quality for the initial channel assignment for the second AP is determined. Similar to the process described above with respect to step 304, channel quality for the initial channel assignment associated with the second AP can be based on one or more metrics from which a received signal quality at the second AP is inferred.

In step 310, a second new channel for the second AP is selected based on the channel quality for the initial channel assignment of the second AP. As discussed above with respect to FIGS. 2A-2C, the AP selection and channel update process of steps 302-310 can be performed for each AP identified in step 302. Once the layer 0, channel calculation process has completed, layer 1 channel calculations can be computed, i.e., considering each AP group with its one-hop network neighbors.

Figure 3B:
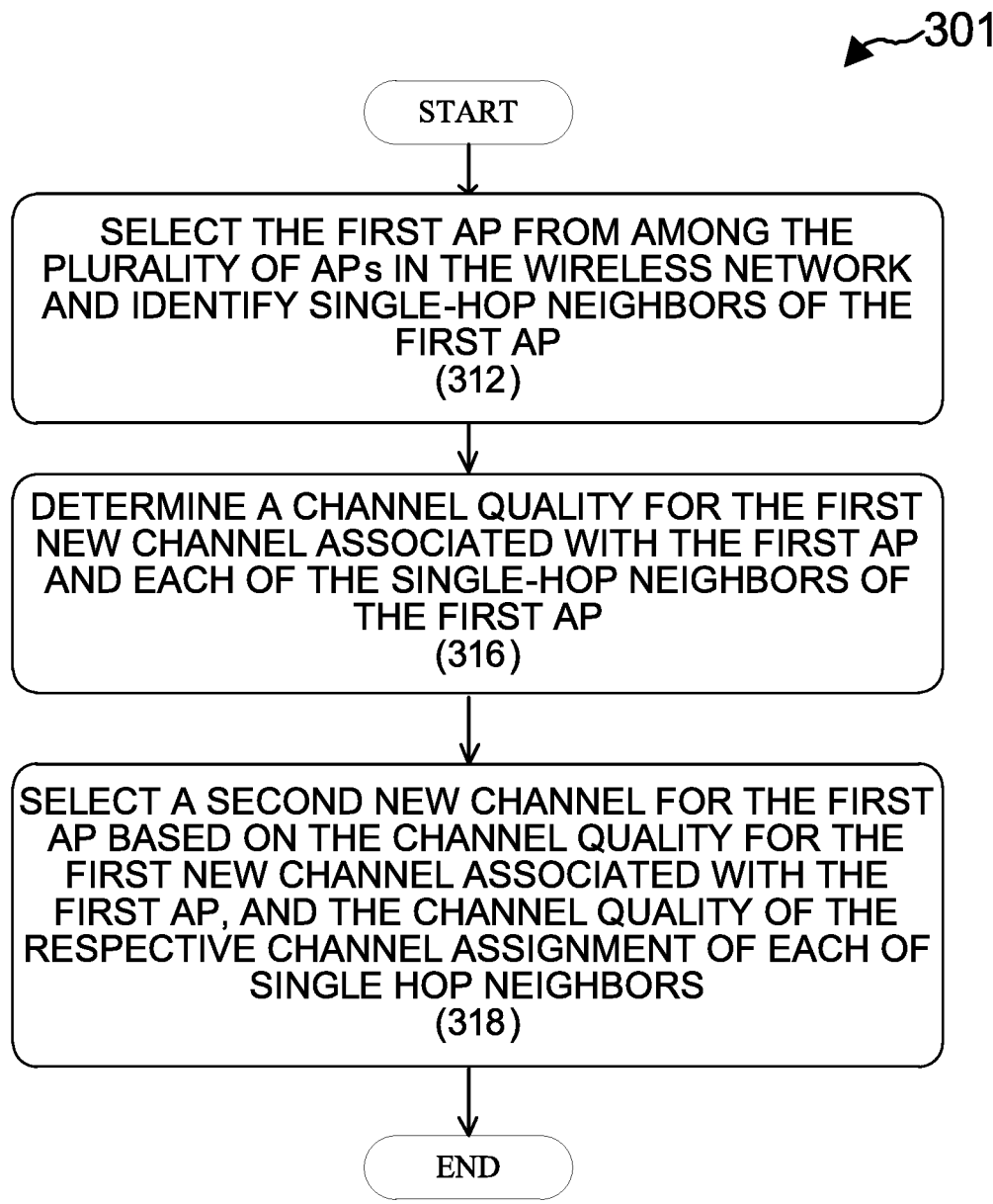

FIG. 3B illustrates an example process 301 for implementing a hierarchical channel re-assignment technique and in particular, for performing a layer 1 channel re-assignment. Process 301 begins with step 312 which the first AP is selected, and each one-hop neighbor of the first AP is identified. As discussed above, one-hop neighbors of the first AP include all nodes in direct communication with the first AP, e.g., without any intervening network nodes.

In step 316, a channel quality is determined for the first new channel associated with the first AP, and each of the one-hop neighbors. That is, channel quality assessment at the layer 1 level are made with respect to groups of APs, which include a selected AP and each of this immediate network neighbors.

By considering channel re-selection for groups of nodes, as opposed to a node-by-node basis, improved channel assignments can be made with respect to layer 0 calculations. For example, layer 1 calculations compute channel re-assignments that can depend on channel swapping between currently assigned channels for different APs. As such, channel quality determinations can be made with respect to channels that would have been deemed unavailable at the layer 0 calculation.

In step 318, a second new channel for the first AP is selected based on the channel quality for the first new channel associated with the first AP and the channel quality of the respective channel assignment of each of the single hop neighbors. Because channel selection can be performed without regard to channel occupancy of neighboring devices in the group (i.e., the group consisting of the first AP and all one-hop neighbors), better channel selections can be made for benefit of the entire group.

By way of further example, if a first AP is assigned to channel 6, and a second AP is assigned to channel 8, then channel calculations made only for the first AP would exclude channel 8, which is already assigned. Conversely, channel calculations made only for the second AP would exclude channel 6, which is also assigned. However, at the layer 1 calculation level, by performing channel selections that optimize channel quality for all nodes in the group, better channel selections can be made at the network level.

Layer 1 calculations, as described with respect to steps 312-318, can be iterated until all APs in the network have been re-assigned. It is understood that any APs that share one-hop group membership with multiple nodes in the network may be re-assigned once at the layer 1 calculation level. That is, APs are not given multiple channel re-assignments on any given calculation layer. Once all channel assignments have been made for one-hop neighbor groups across the network, layer 0 calculations can be re-iterated, e.g., as described in steps 302-310, discussed in reference to FIG. 3A, concluding the layer 1 calculation.

It is understood that any number of additional higher layer calculations can be performed, without departing from the scope of the technology. For example, selection of a particular AP and all of its two-hop network neighbors can be performed in a layer 2 calculation. Similarly, selection of an AP and its three-hop network neighbors can be performed in a layer 3 calculation. Depending on implementation and the availability of computing resources, channel calculation and selection may be performed for an entire network, i.e., all wireless nodes.

Additionally, as discussed above, multiple iterations of channel assignment calculations may be performed at each hierarchical level, without pushing the physical channel assignments to the network. That is, different channel assignment configurations can be simulated and compared to determine optimal AP channel assignment associations before network changes are deployed.

Performing channel calculations on a hierarchical basis vastly reduces the computational difficulty of the channel selection process and enables channel re-assignment to be performed more quickly and frequently, while also providing assignments that optimize frequency utilization at a network (global) level.

Figure 4:
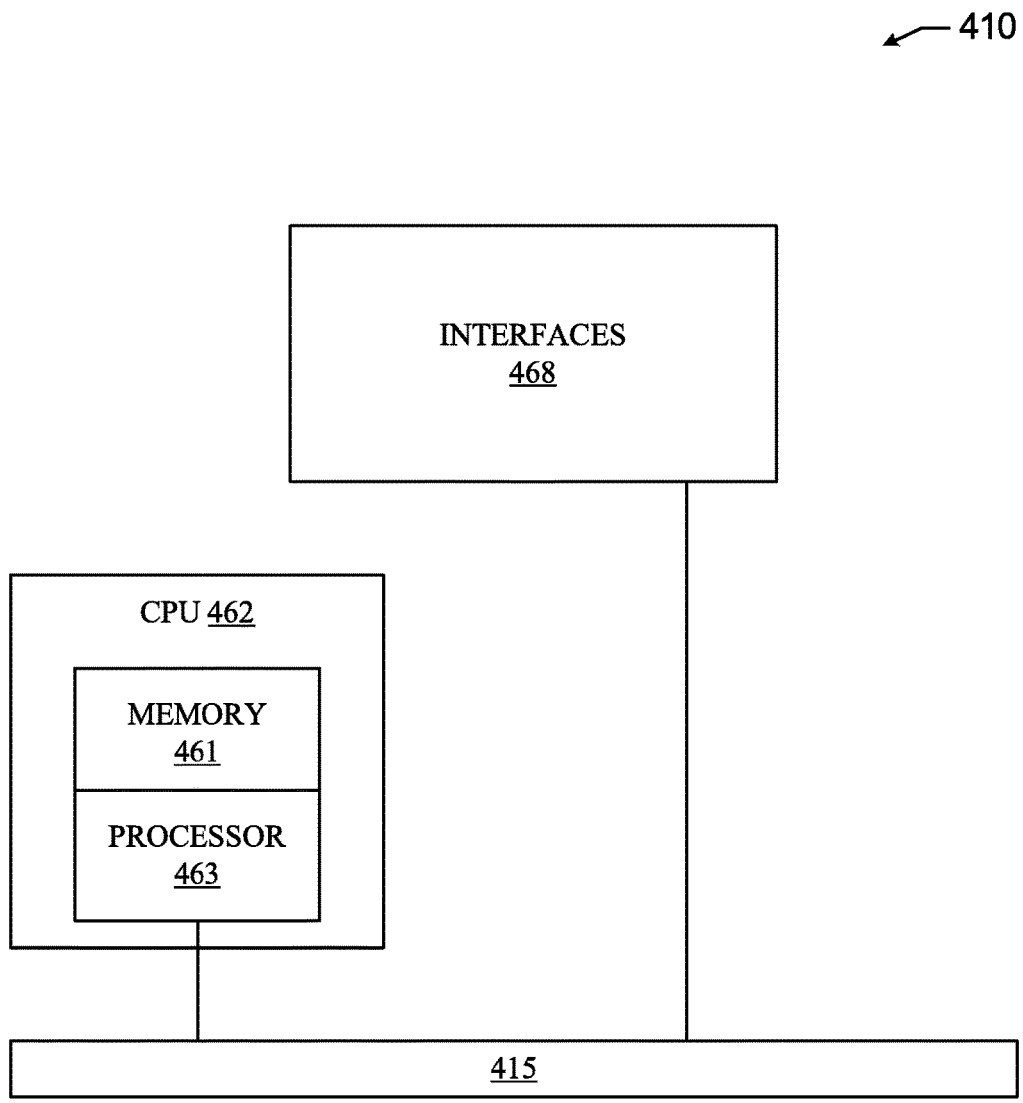
FIG. 4 illustrates an example network device on which some aspects of the technology can be implemented.

FIG. 4 illustrates an example network device 410 that can be used to implement one or more APs as discussed above. Network device 410 includes master central processing unit (CPU) 462, interfaces 468, and a bus 415 e.g., a Peripheral Computer Interconnect (PCI) bus. CPU 462 can be configured to perform monitoring for one or more virtual network functions under the control of software including an operating system and any appropriate applications software. CPU 462 can include one or more processors 463, such as processors from the Intel, ARM, and/or Motorola family of microprocessors or the MIPS family of microprocessors. In an alternative embodiment, processor 463 is specially designed hardware for controlling the operations of network device 410. In a specific embodiment, a memory 461 (such as non-volatile RAM and/or ROM) also forms part of CPU 462. However, there are many different ways in which memory could be coupled to the system.

Interfaces 468 can be provided as wireless interface cards (sometimes referred to as "network interface cards" (NICs)

or "line cards"). Generally, they control the sending and receiving of data packets over a wireless network and sometimes support other peripherals used with device 410. Among the interfaces that may be provided are Ethernet interfaces, frame relay interfaces, cable interfaces, Digital Subscriber Line (DSL) interfaces, token ring interfaces, and the like. In addition, various very high-speed interfaces can be provided such as fast token ring interfaces, wireless interfaces, Ethernet interfaces, Gigabit Ethernet interfaces, Asynchronous Transfer Mode (ATM) interfaces, High Speed Serial Interfaces (HSSIs), Point of Sale (POS) interfaces, Fiber Distributed Data Interface (FDDIs), and the like. Generally, these interfaces can include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more non-transitory memories or memory modules (including memory 461) configured to store program instructions for general-purpose network operations and mechanisms necessary to implement one or more steps of a service chain auto-tuning process of the subject technology.

For example, memory 461 can include a non-transitory computer-readable medium that includes instructions for causing CPU 462 to execute operations for identifying a plurality of wireless access points (APs) in the wireless network, each of the wireless APs being associated with an initial channel assignment, selecting a first AP from among the plurality of wireless APs in the wireless network, determining a channel quality for the initial channel assignment associated with the first AP, and selecting a first new channel for the first AP based on the channel quality for the initial channel assignment associated with the first AP. In some aspect, CPU 462 can further be configured to execute operations including selecting a second AP from among the plurality of wireless APs in the wireless network, determining a channel quality for the initial channel assignment associated with the second AP, and selecting a first new channel for the second AP based on the channel quality for the initial channel assignment associated with the second AP.

As discussed above, CPU 462 can also be configured to perform higher layer channel assignment calculations. For example, CPU 462 can be configured to execute operations including selecting the first AP from among the plurality of wireless APs in the wireless network, identifying one or more one-hop neighbors of the first AP, wherein each of the one or more one-hop neighbors is directly connected to the first AP in the wireless network, determining a channel quality for the first new channel associated with the first AP, determining a channel quality for a respective channel assignment of each of the one-hop neighbors of the first AP, and selecting a second new channel for the first AP based on the channel quality for the first new channel associated with the first AP, and the channel quality of the respective channel assignment of each of the one or more one-hop neighbors.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method for performing channel assignments in a wireless network, the method comprising:
    identifying a plurality of wireless access points (APs) in the wireless network, each of the wireless APs being associated with an initial channel assignment;
    selecting a first AP from among the plurality of wireless APs in the wireless network;
    determining a channel quality for the initial channel assignment associated with the first AP;
    first selecting a first new channel for the first AP based on the channel quality for the initial channel assignment associated with the first AP;
    selecting a second AP from among the plurality of wireless APs in the wireless network;
    determining a channel quality for the initial channel assignment associated with the second AP; and
    second selecting a first new channel for the second AP based on the channel quality for the initial channel assignment associated with the second AP;

wherein each of the first and second selecting comprises:
  estimating for a particular AP as Node P performance on a channel c with channel width cw using the relationship of $$NodeP(c, cw) = \prod_{b=20MHz}^{cw} channel\_metric(c, b)^{load(b)}$$

wherein:

channel_metric(c,b)=airtime(c,b)×capacity(c,b);

airtime (c,b) represents an estimated proportion of airtime th expected for a given AP on a particular channel c with channel width b;
capacity(c,b) is based on channel quality, non-wifi interference, and/or channel width;
where load(b) is channel usage and is proportional to the number of associated clients with maximum channel width.

2. The computer-implemented method of claim 1, further comprising:
  selecting the first AP from among the plurality of wireless APs in the wireless network;
  identifying one or more one-hop neighbors of the first AP, wherein each of the one or more one-hop neighbors is directly connected to the first AP in the wireless network;
  determining a channel quality for the first new channel associated with the first AP;
  determining a channel quality for a respective channel assignment of each of the one-hop neighbors of the first AP; and
  selecting a second new channel for the first AP based on the channel quality for the first new channel associated with the first AP, and the channel quality of the respective channel assignment of each of the one or more one-hop neighbors.

3. The computer-implemented method of claim 2, wherein selecting the second new channel for the first AP further comprises:
  selecting a new channel assignment for each of the one-hop neighbors of the first AP.

4. The computer-implemented method of claim 2, further comprising:
  selecting the first AP from among the plurality of wireless APs in the wireless network;
  identifying one or more two-hop neighbors of the first AP, wherein each of the one or more two-hop neighbors is connected to the first AP via one other node in the wireless network;
  determining a channel quality for the second new channel associated with the first AP;
  determining a channel quality for a respective channel assignment of each of the one or more two-hop neighbors of the first AP; and
  selecting a third new channel for the first AP based on the channel quality for the second new channel associated with the first AP, and the channel quality of the respective channel assignment for each of the one or more two-hop neighbors.

5. The computer implemented method of claim 4, wherein selecting the third new channel for the first AP further comprises:
  selecting a new channel assignment for each of the two-hop neighbors of the first AP.

6. The method of claim 1, wherein determining the channel quality for the initial channel assignment associated with the first AP is further based on a channel switch penalty.

7. The method of claim 1, wherein determining the channel quality for the initial channel assignment associated with the second AP is further based on a channel switch penalty.

8. A system comprising:
  one or more processors;
  a network interface coupled to the processors, the network interface configured for exchanging data with a wireless computer network; and
  a non-transitory computer-readable medium comprising instructions stored therein, which when executed by the processors, cause the processors to perform operations comprising:
    identifying a plurality of wireless access points (APs) in the wireless network, each of the wireless APs being associated with an initial channel assignment;
    selecting a first AP from among the plurality of wireless APs in the wireless network;
    determining a channel quality for the initial channel assignment associated with the first AP;
    first selecting a first new channel for the first AP based on the channel quality for the initial channel assignment associated with the first AP;
    selecting a second AP from among the plurality of wireless APs in the wireless network;
    determining a channel quality for the initial channel assignment associated with the second AP; and
    second selecting a first new channel for the second AP based on the channel quality for the initial channel assignment associated with the second AP;
  wherein each of the first and second selecting comprises:
    estimating for a particular AP as Node P performance on a channel c with channel width cw using the relationship of $$NodeP(c, cw) = \prod_{b=20MHz}^{cw} channel\_metric(c, b)^{load(b)}$$

wherein:

channel_metric(c,b)=airtime(c,b)×capacity(c,b);

airtime (c,b) represents an estimated proportion of airtime th expected for a given AP on a particular channel c with channel width b;
capacity(c,b) is based on channel quality, non-wifi interference, and/or channel width;
where load(b) is channel usage and is proportional to the number of associated clients with maximum channel width.

9. The system of claim 8, wherein the instructions are further configured to cause the processors to perform operations comprising:
  selecting the first AP from among the plurality of wireless APs in the wireless network;
  identifying one or more one-hop neighbors of the first AP, wherein each of the one or more one-hop neighbors is directly connected to the first AP in the wireless network;
  determining a channel quality for the first new channel associated with the first AP;

determining a channel quality for a respective channel assignment of each of the one-hop neighbors of the first AP; and selecting a second new channel for the first AP based on the channel quality for the first new channel associated with the first AP, and the channel quality of the respective channel assignment of each of the one or more one-hop neighbors.

10. The system of claim 9, wherein selecting the second new channel for the first AP further comprises:

selecting a new channel assignment for each of the one-hop neighbors of the first AP.

11. The system of claim 9, wherein the instructions are further configured to cause the processors to perform operations comprising:

selecting the first AP from among the plurality of wireless APs in the wireless network;

identifying one or more two-hop neighbors of the first AP, wherein each of the one or more two-hop neighbors is connected to the first AP via one other node in the wireless network;

determining a channel quality for the second new channel associated with the first AP;

determining a channel quality for a respective channel assignment of each of the one or more two-hop neighbors of the first AP; and selecting a third new channel for the first AP based on the channel quality for the second new channel associated with the first AP, and the channel quality of the respective channel assignment for each of the one or more two-hop neighbors.

12. The system of claim 11, wherein selecting the third new channel for the first AP further comprises:

selecting a new channel assignment for each of the two-hop neighbors of the first AP.

13. The system of claim 8, wherein determining the channel quality for the initial channel assignment associated with the first AP is further based on a channel switch penalty.

14. The system of claim 8, wherein determining the channel quality for the initial channel assignment associated with the second AP is further based on a channel switch penalty.

15. A non-transitory computer-readable storage medium comprising instructions stored therein, which when executed by one or more processors, cause the processors to perform operations comprising:

identifying a plurality of wireless access points (APs) in a wireless network, each of the wireless APs being associated with an initial channel assignment;

selecting a first AP from among the plurality of wireless APs in the wireless network;

determining a channel quality for the initial channel assignment associated with the first AP;

first selecting a first new channel for the first AP based on the channel quality for the initial channel assignment associated with the first AP;

selecting a second AP from among the plurality of wireless APs in the wireless network;

determining a channel quality for the initial channel assignment associated with the second AP; and second selecting a first new channel for the second AP based on the channel quality for the initial channel assignment associated with the second AP;

wherein each of the first and second selecting comprises:
estimating for a particular AP as Node P performance on a channel c with channel width cw using the relationship of $$NodeP(c, cw) = \prod_{b=20MHz}^{cw} channel\_metric(c, b)^{load(b)}$$

wherein:

channel_metric$(c,b)$=airtime$(c,b)$×capacity$(c,b)$;

airtime (c,b) represents an estimated proportion of airtime th expected for a given AP on a particular channel c with channel width b;

capacity(c,b) is based on channel quality, non-wifi interference, and/or channel width;

where load(b) is channel usage and is proportional to the number of associated clients with maximum channel width.

16. The non-transitory computer-readable storage medium of claim 15, wherein the instructions are further configured to cause the processors to perform operations comprising:

selecting the first AP from among the plurality of wireless APs in the wireless network;

identifying one or more one-hop neighbors of the first AP, wherein each of the one or more one-hop neighbors is directly connected to the first AP in the wireless network;

determining a channel quality for the first new channel associated with the first AP;

determining a channel quality for a respective channel assignment of each of the one-hop neighbors of the first AP; and selecting a second new channel for the first AP based on the channel quality for the first new channel associated with the first AP, and the channel quality of the respective channel assignment of each of the one or more one-hop neighbors.

17. The non-transitory computer-readable storage medium of claim 16, wherein selecting the second new channel for the first AP further comprises:

selecting a new channel assignment for each of the one-hop neighbors of the first AP.

18. The non-transitory computer-readable storage medium of claim 16, wherein the instructions are further configured to cause the processors to perform operations comprising:

selecting the first AP from among the plurality of wireless APs in the wireless network;

identifying one or more two-hop neighbors of the first AP, wherein each of the one or more two-hop neighbors is connected to the first AP via one other node in the wireless network;

determining a channel quality for the second new channel associated with the first AP;

determining a channel quality for a respective channel assignment of each of the one or more two-hop neighbors of the first AP; and selecting a third new channel for the first AP based on the channel quality for the second new channel associated with the first AP, and the channel quality of the respective channel assignment for each of the one or more two-hop neighbors.

19. The non-transitory computer-readable storage medium of claim 18, wherein selecting the third new channel for the first AP further comprises:

selecting a new channel assignment for each of the two-hop neighbors of the first AP.

20. The non-transitory computer-readable storage medium of claim 15, wherein determining the channel quality for the initial channel assignment associated with the first AP is further based on a channel switch penalty.

\* \* \* \* \*